Figure 1:
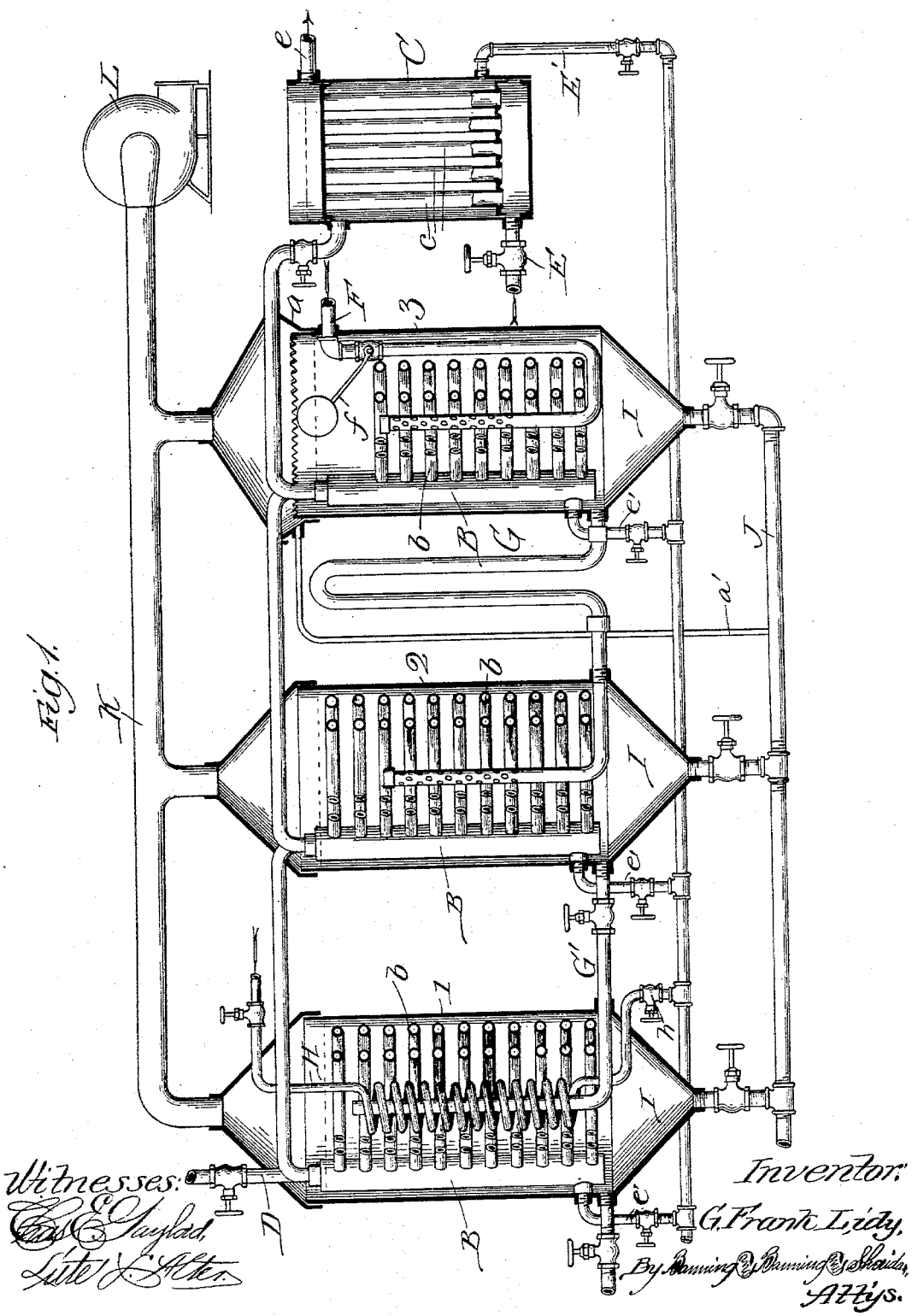

(No Model.) 2 Sheets—Sheet 1.

G. F. LIDY.
APPARATUS FOR PURIFYING WATER.

No. 593,054. Patented Nov. 2, 1897.

Witnesses:

Inventor:
G. Frank Lidy,
By Banning & Banning & Sheridan,
Att'ys.

(No Model.)
2 Sheets—Sheet 2.
G. F. LIDY.
APPARATUS FOR PURIFYING WATER.
No. 593,054.
Patented Nov. 2, 1897.
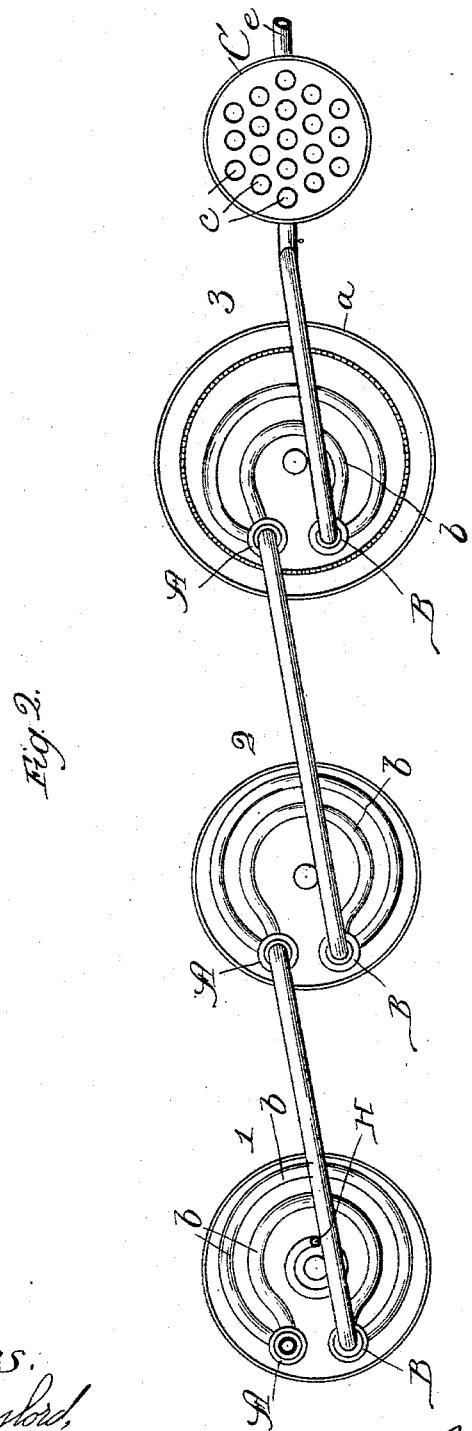
Witnesses.
Inventor.
G. Frank Lidy.
By Banning & Banning & Sheridan,
Att'ys.

UNITED STATES PATENT OFFICE.

GEORGE F. LIDY, OF CHICAGO, ILLINOIS.

APPARATUS FOR PURIFYING WATER.

SPECIFICATION forming part of Letters Patent No. 593,054, dated November 2, 1897.

Application filed September 23, 1896. Serial No. 606,722. (No model.)

*To all whom it may concern:*

Be it known that I, GEORGE F. LIDY, a citizen of the United States, residing at Chicago, Illinois, have invented certain new and useful Improvements in Apparatus for Purifying Water, of which the following is a specification.

The object of my invention is to purify water, so as to free it from all impurities and extraneous matter and thus make it more suitable for the manufacture of ice and other purposes; and my invention consists in the features, combinations, and details of construction hereinafter described and claimed.

In the drawings, Figure 1 is a vertical sectional elevation of an apparatus by which I embody or carry out my process, and Fig. 2 a plan diagram showing the arrangement and connection of the parts.

In carrying out my process for purifying water I arrange a number of tanks 1, 2, and 3, of a size to afford the desired capacity, preferably in line with each other, as shown in Fig. 2. These tanks may be made of boiler metal or of other suitable material for the purpose. I arrange in each of the purifying-tanks two vertical headers A and B, provided with coils of pipe $b$, connecting one with the other, as shown in Fig. 2. These connecting-coils may be arranged as close together and in as large number as desired. A pipe leads from the header B in tank 1 to the header A in tank 2 and from the header B in tank 2 to the header A in tank 3, so as to afford communication between the different tanks. From the header B in tank 3 a pipe leads to a steam-condenser C. An exhaust-steam inlet-pipe D admits exhaust-steam into the header A of tank 1, whence it passes around through the pipes $b$ and into the header B, whence it passes on to the header A in tank 2, where it again passes through the pipes $b$ into the header B and passes on to header A in tank 3, and so on to the end of the series, where more than three tanks are used, from which end tank the exhaust-steam that remains passes on to the condenser-tank C to be condensed. A water-inlet pipe E admits a stream of water into a series of pipes $c$ in the condenser-tank, so that a stream of cold water may flow through such pipes and pass off through a pipe $e$ to a waste or other place of deposit. The exhaust-steam which is condensed in the tank C passes through a pipe E', which has connecting-pipes $e'$ with each of the headers B in the purifying-tanks. This permits not only the condensation in the tank C, but also allows the condensation in the headers B, to pass off to a place of deposit, where it may be again returned to the boilers and used for the generation of steam.

In order to permit the water to be purified, I employ a pipe F, which has connections with a proper source of supply and which terminates, preferably, in a perforated portion in the last of the series of purifying-tanks, which in the system shown in the drawings is tank 3. This permits the water to flow into the tanks and fill the spaces or interstices in such tanks between the coils of pipes connecting the headers A and B. A float-valve $f$ is arranged in this tank to regulate the supply of water needed. The top of tank 3 terminates, preferably, in serrations or notches, as shown, and is provided with a flaring top $a$, which rises above the notches or serrations, so that such water as overflows is carried off through a waste-pipe $a'$. The last tank of the series or tank 3 is connected with the next one or tank 2 by a bent pipe G, which rises to a point as high as the tank and then enters the next or tank 2 near its bottom, terminating, preferably, in a portion provided with holes or orifices, as in the case of the inlet-pipe in tank 3. This admits a supply of water to the tank 2 when the tank 3 has become filled. Tank 2 in turn is connected with the first of the series or tank 1 by a pipe G', which, however, need not be provided with holes or perforations, although they may be employed, if desired.

In order to still further heat the water and insure its more perfect purification, I may in some cases employ a coil of pipe H, which I have shown in one of the purifying-tanks. Live steam is preferably admitted into this coil, and near its bottom is arranged a valve $h$, by which the condensation of this steam is permitted to escape as desired into the exhaust or discharge pipe E'. The bottoms of the various purifying-tanks are provided with settling-chambers I, into which the sediment and solid impurities may settle and be drawn off through a pipe J to a waste or other place of deposit. In order to carry off steam and gases, the tanks may be covered, if desired, as shown in Fig. 1, and connected with a pipe K, that leads to an exhaust-fan L, which serves to draw off such steam and gases as may rise to the surface of the water being purified.

I have shown all of the purifying-tanks as covered and connected with the pipes K and exhaust L; but, if desired, only the last of the series of purifying-tanks need be so covered and connected, as in the case of the others, the steam and gases being generated by greater heat in the steam will in most cases pass off without any mechanical assistance.

I have shown three purifying-tanks in my drawings and have described them in my specification, as shown. I do not wish, however, to confine myself to three tanks or any other specific number, so long as I employ a series—two or more.

In operation the water to be purified enters the last of a series of purifying-tanks, and the exhaust-steam by which it is to be heated and purified enters at the first of such series. Thus water of the lowest temperature will be brought first into contact with pipes containing exhaust-steam of the lowest temperature and will in each succeeding stage be brought into contact with pipes containing steam of increasing temperature, so that at the end of the operation the water at its highest temperature and the steam at its highest temperature will be in the same tank, and the water as it leaves the end purifying-tank is in its condition of greatest purity.

The advantages of my apparatus over others in use—in, for instance, the manufacture of ice—are that there is a large saving in the steam capacity employed at the ice plant, inasmuch as the water employed in the manufacture of the ice does not have to be evaporated and condensed, as is now the case, in that the steam used in the running of the ice plant is utilized to purify the water employed in the manufacture of the ice, and in that the water arising from the condensation of the steam that has been already used for the running of the ice-plant machinery may again be returned to the boilers and used over and over again, so that there is a large saving effected in the quantity of water used in the manufacture of the ice, which is often of great importance, which condensed water being returned to the boilers clean and free from sediment does not foul the boilers and dispenses with the frequent cleaning that is now required.

What I regard as new, and desire to secure by Letters Patent, is—

1. In an apparatus for purifying water, the combination of a series of purifying-tanks, headers arranged in such tanks, pipes connecting the headers in each of the tanks, an inlet-pipe for supplying exhaust-steam to one of the headers in the first of the series of purifying-tanks and through the connecting-pipes to the other header, a pipe connecting the header into which the exhaust-steam is admitted through the connecting-pipes with one of the headers in the next purifying-tank, and so on throughout the series of purifying-tanks, and means for introducing water into the last of the series of purifying-tanks and from each to the next.

2. In an apparatus for purifying water, the combination of a series of purifying-tanks, headers arranged in such tanks, pipes connecting the headers in each of the tanks, an inlet-pipe for supplying exhaust-steam to one of the headers in the first of the series of purifying-tanks and through the connecting-pipes to the other header, a pipe connecting the header into which the exhaust-steam is admitted through the connecting-pipes with one of the headers in the next purifying-tank, and so on throughout the series of purifying-tanks, means for introducing water into the last of the series of purifying-tanks and from each to the next, and means for drawing off gases and vapors generated in the purifying-tanks.

GEORGE F. LIDY.

Witnesses:
THOMAS A. BANNING,
ANNIE C. COURTENAY.